Figure 1:
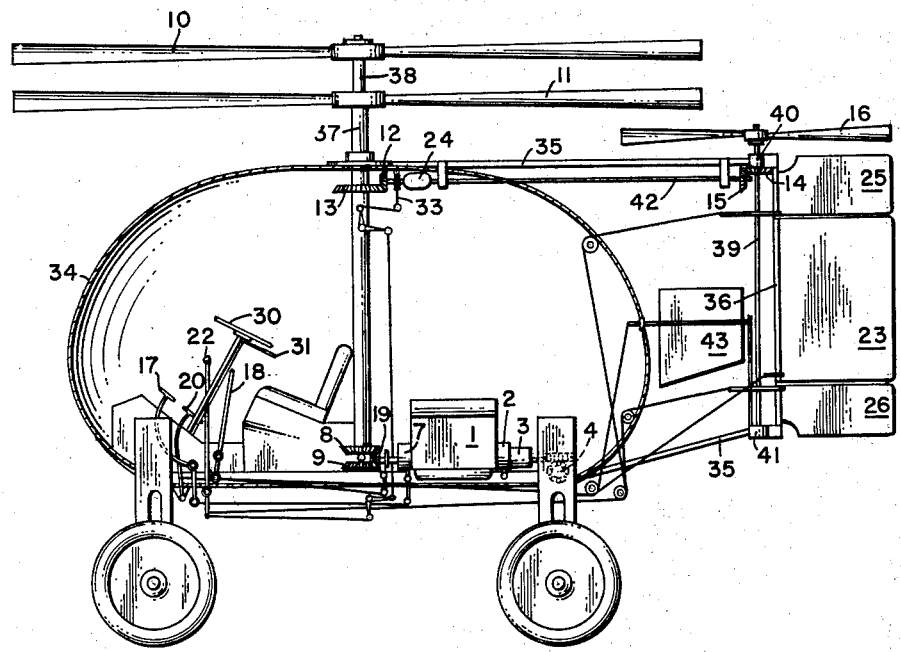

July 9, 1963

V. I. KOUMP 3,096,953

AUTOHELICOPTER

Filed Sept. 4, 1959

2 Sheets-Sheet 1

INVENTOR

Vladimir I. Koump.

July 9, 1963  V. I. KOUMP  3,096,953
AUTOHELICOPTER
Filed Sept. 4, 1959  2 Sheets-Sheet 2

INVENTOR

Vladimir I. Koump.

United States Patent Office 3,096,953
Patented July 9, 1963

3,096,953
AUTOHELICOPTER
Vladimir I. Koump, 4705 92nd St., Elmhurst 73, N.Y.
Filed Sept. 4, 1959, Ser. No. 838,246
4 Claims. (Cl. 244—17.19)

The present invention relates to apparatus designed to function as an aircraft and as a ground vehicle, that is to say to a vehicle capable of taking to the air, landing and continuing to travel on the ground, and taking to the air again without there being a necessity of dismounting or mounting anything to effect a change in the manner of travel.

The inventive apparatus, further called an autohelicopter, represents a combination of an aerodyne capable of rising or descending vertically, flying horizontally or in an inclined path, and of a contemporary automobile.

Machines of a similar character have been realized in prior art, showing, however, a number of deficiences. Machines are known using carrying propeller rotors with variable pitch. The control mechanisms of known machines is such that it makes it impossible to use other propellers than such with variable pitch.

One object of this invention is the use for carrying the apparatus when air borne, and also for imparting horizontal speed, of two main rotors with a constant pitch. The control of the apparatus is thereby independent of the pitch of the main rotors.

Another object consists of the construction of a tail part of the apparatus which allows to exert complete control of the apparatus when air borne, relative to all three of its principal axes without there being a necessity to take recourse to a variation of the pitch of the carrying or main propellers. All propellers used may therefore be simple propellers with a constant pitch, obviating thereby the most complicated, sensitive and expensive feature of helicopter propellers.

It will be seen that in the absence of the inventive tail construction which comprises four various tail vanes and a tail rotor, which exert three different functions, the functioning of an apparatus using constant-pitch propellers is evidently impossible.

Description of Three Rotors of the Autohelicopter

Two working rotors which rotate on the same axis are rigidly fixed to two ends of axles, which protrude from the cabin at the center of the roof section. The axles rotate one inside the other in opposite directions. Each of the rotors is a two-blade propeller with a constant angle of attack, placed one above the other in a horizontal plane. Both rotors, to the same degree, are working rotors. Both of them are of the same form, have the same diameter and speed of rotation. They are brought into action by the crankshaft of the autohelicopter motor. The third, tail two-blade rotor (which serves to control the operation of the autohelicopter in connection with the horizontal, principal axis) rotates in two bearings, which are secured to the structural frame of the tail end of the autohelicopter. Rotation of this rotor is brought about by one of the axles of the main rotor and is transmitted with the aid of two pairs of conical gears. These gears are tied with the ends of the axle, which passes from the main rotor to the tail rotor.

These and other features of this invention, which is a continuation-in-part of the one disclosed in patent application Ser. No. 579,197 filed on April 19, 1956, will become apparent as reference is had to the following specification and the accompanying drawings, of which—

Figure 2:
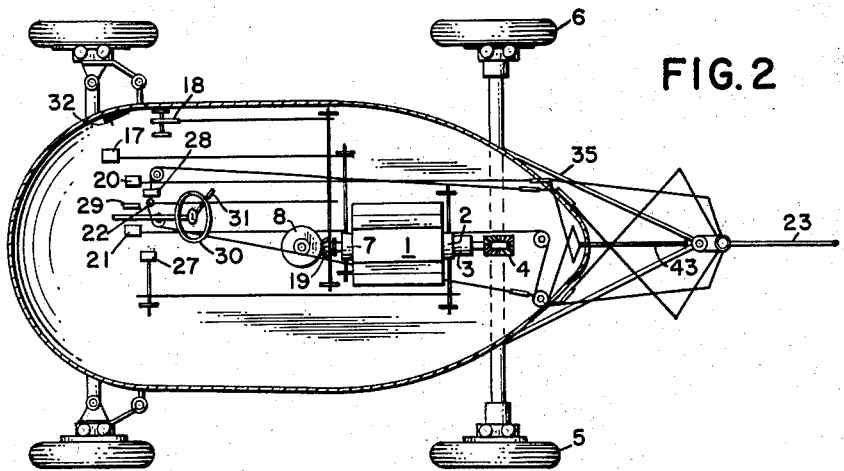
Figure 3:
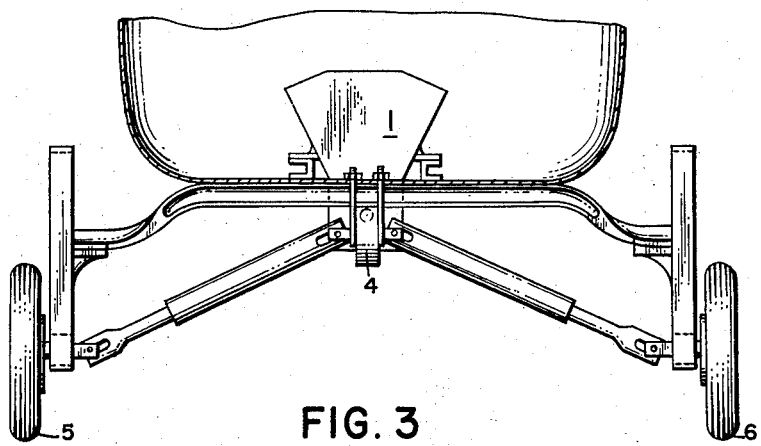
Figures 4, 5:
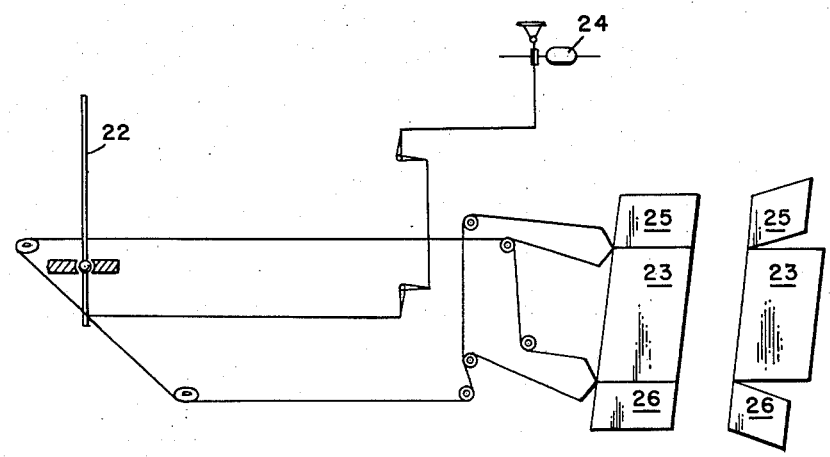

FIG. 1 is a schematic side view of the apparatus;
FIG. 2 is a schematic plan view of the apparatus;
FIG. 3 is a schematic side view of the tail part;
FIG. 4 is a schematic representation of the functioning of the control elements; and
FIG. 5 is a showing of the roll control elements in operation.

In order that the invention may be more clearly understood, an embodiment thereof will now be described with particular reference to the inventive novelty as stated hereinabove.

The autohelicopter comprises an enclosed cabin 34, which may be streamlined, with transparent walls and a transparent ceiling of a construction known for itself. The cabin is resiliently mounted in a well-known manner on a carriage frame-like construction which is movable on four wheels, of which the two rear wheels 5, 6 are driven wheels when the apparatus is stationed or moving on the ground. All wheels are also used as landing wheels when the apparatus is landing.

The autohelicopter has further two main carrying rotating propellers 10 and 11 disposed above the cabin. Both main propellers 10 and 11 have inventively a constant pitch. Both said main carrying propellers are rotating in two substantially parallel and substantially horizontal planes, and in opposite directions of rotation.

The rear outer part, or the tail part, of the apparatus comprises the control elements adapted to control the flight of the apparatus when air borne. The tail part comprises a third horizontal tail propeller 16 of a constant-pitch construction which is mounted to rotate in a substantially horizontal plane. Propeller 16 is mounted on a vertical axis 39 which in turn is mounted in bearings 40 and 41. Other control elements disposed behind the cabin are a vertical fin 43 and vertical control vanes 23, 25 and 26. All these control elements are mounted in a manner known for itself on a tail part frame construction which in turn is steadfastly connected to the elements supporting the cabin 34 by suitable means, such as for instance tubular elements 35 and 36.

In the interior of the cabin are located seats for passengers, for example two seats as shown in the drawings, and control elements of the apparatus. The motor of the apparatus 1 may be mounted inside of the cabin 34; the motor may have two axis ends, as shown in FIGS. 1 and 2. The forward end drives in a manner known for itself the main carrying propellers 10 and 11, for instance over clutch 7 and gears 19—8—9 adapted to drive the concentric vertical axes of rotors 10 and 11. The rotation of the tail propeller is derived from the outer of the said concentric vertical axes over gears 13—12, mechanism 24 and gears 15—14. The other axis end of motor 1 is adapted to drive the rear wheels 5 and 6 of the apparatus over clutch 2, speed gear 3 and differential 4 in a manner known for itself in the automobile art.

The control of the apparatus is concentrated in the forward part of the cabin and comprises six pedals, two levers, the usual steering wheel 30 and speed lever 31. The controls of the apparatus when the apparatus contacts ground comprise gas pedal 29, clutch pedal 27 and brake pedal 28. The controls of the apparatus when air borne comprises three pedals 17, 20 and 21, two levers 22 and 18, and gas lever 32. Their functions are as follows.

Pedal 17 is connected to clutch 7 adapted to disconnect all three propellers 10, 11 and 16 from motor 1 when bevel gear 19 is engaging gears 8 and 9, this engagement being produced by means of lever 18.

Lever 22 connected to lever 33 which controls the tail rotor 16 through mechanism 24, controls at the same time vanes 25 and 26 at lateral turns of the apparatus when air borne. The combined control of control lever 22 is made clear in FIG. 4. A forward or backward tilting of lever 22 in a plane parallel to the vertical plane of symmetry of the apparatus controls only tail rotor 16. Sideward pivoting of this lever in a plane perpendicular to the aforesaid vertical plane of symmetry causes control of only vanes 25 and 26 in a manner known for itself. Control lever 22 can also, when pivoted both in the aforesaid plane parallel and in the aforesaid plane perpendicular to the vertical plane of symmetry of the apparatus, control both rotor 16 and vanes 25 and 26. Mechanism 24 is a device for changing the direction of rotation of rotor 16 or for entirely disconnecting it as known in prior art.

Pedals 20 and 21 serve for combined control of vanes 23 and 43 at turns of the apparatus when air borne around the principal yaw axis of the apparatus. Lateral turns of the apparatus at conventional horizontal flight is effected by pedals 20 and 21 which are connected to vane 23 adapted to pivot to a limited angle about its vertical axis. A depression of each of these pedals to approximately a half of its entire depression causes a turn of the air borne apparatus having a horizontal speed. At hovering of the apparatus or at its vertical ascent or descent, a depression of each of these pedals to a position within the aforesaid first half of its total depression produces no effect by pivoting of vane 23. In such case, a further depression of each of these pedals will control plane 43 which plane will pivot about its horizontal axis, and the downward air stream created by rotors 10 and 11 will cause a turn of the entire apparatus about its vertical or yaw axis.

Description of Element 43

The element 43 is one of the major parts in controlling the autohelicopter. It is intended to control the helicopter in turns around its vertical axis while in stationary flight. This element 43 is a right-angle plane placed outside the cabin (in the middle rear part) between the cabin and vertical axle of the tail rotor 39. This plane rotates together with the horizontal axis, which passes through the center of this plane in the direction from one edge of the plane to the other and is tightly secured with the plane. One end of the axis rotating in the bearing, which is secured to the rear wall of the cabin, protrudes into the inner portion of the cabin and is connected by pedals 20—21. The other end of this rotating axis is in the bearing of the vertical bar, which is tightly secured at its lower part to the structural part 35. Since the control of element 23 are also connected to the pedals 20—21, then these elements 23—43 interact. By depressing one of the pedals 20—21 the rudder of the apparatus 23 will be brought into operation and with further depression of these same pedals, the plane 43, which is situated on the way of the downwash created by the two major rotors in flight, will be brought into action.

The gas lever 32 is disposed (see FIG. 2) at the right hand side of the inside of the apparatus, and is adapted for use only when the apparatus is air borne.

FIG. 3 shows in detail the coupling of the differential 4 to the rear wheels 5 and 6, and the amortization of the rear wheels, however does not contain novelty.

The apparatus is controlled for horizontal flight by actuating controls to impart an inclined position to the main rotor axis, whereby a horizontal component of the main rotor thrust is allowed to accelerate the apparatus in a horizontal direction.

Description of the Structural Position

The structural position and the interaction of elements in the autohelicopter are as follows: The body of the autohelicopter is a cabin of oval form 34, which has at its lower part four wheels. In order to move the helicopter on the ground one uses the motor installed inside the cabin, on the frame of the floor and at its center. Movement is realized by connecting the closest end of the crankshaft of the motor through clutch 2 and the gearbox 3 with the differential 4 at the rear axis of the autohelicopter. The opposite end of the motor crankshaft through the clutch 7 and the gear 19 brings into rotation two other gears 8 and 9 which are secured at the lower ends of the vertical axles 37—38 which rotate one inside the other, which pass from the bottom to the top through the cabin and exit at the top part of the cabin. They terminate at the two secured rotors which are attached to them 10 and 11. Thus, both the rotating axles 37 and 38 are secured in the bearing which tightly fixed with the frame of the cabin floor, and second bearing which is attached to the roof of the cabin.

The rear portion of the autohelicopter has a tail construction which is made up of vertical axle 36 which is held fast by four pipe-like structural ties 35 to the body of the cabin 34; It thus forms a structure of two triangles, the tops of which are connected to the beginning and ends of the axle 36. The axle in question (36) has three elements for autohelicopter control 23, 25 and 26. These elements are placed vertically, one on the other (with rotation of the horizontal plane). Parallel to the axle 36 in the bearings 40—41 of the described construction, there is also a vertically rotating axle 39 which at its top part ends with the tail rotor 16. This rotor is secured on the axle 39. The axle 39, at its top part structural tie 35 is equipped with a conical gear which interacts with the other gear 15, equipped on the horizontal axle which passes into the inner portion of the cabin and is connected with the element 24. Element 24 has at its end the gear 12 which interacts with gear 13 attached to axle 37. Operating the lever 22 which is in the cabin (with the aid of other transmitting levers leading to the element 24 which is attached to the roof of the cabin) it is possible, with the aid of two pairs of conical gears (which are held fast to the ends of the horizontal axle) to control the rotation of the tail rotor 16 thus allowing it to rotate in one or the other direction or permitting one to completely disconnect it from the axle 37.

The operation of the apparatus and its control are effected as follows:

The control of the apparatus relative to its principal pitch axis is effected by tail rotor 16 which allows the apparatus to climb or to lose height while advancing horizontally.

The control of the apparatus relative to its principel yaw axis is effected by vane 23 when the apparatus has sufficient horizontal speed, and by vane 43 when the apparatus is hovering in the air and has no horizontal speed component, also at vertical ascent and descent.

The control relative to the principal roll axis is effected by vanes 25 and 26 which allow to incline the apparatus sidewards.

It will be seen from the abovesaid that the basic novelty of the instant invention consists in a combination of a helicopter with two constant pitch rotors rotating in opposite directions with all elements and accessories necessary for automotive motion of the apparatus when it contacts ground in the same manner as conventional automobiles.

I claim:

1. An autohelicopter, comprising in combination with a cabin having a body portion and a tail portion, two main driving rotors, each of said main driving rotors having a constant pitch, vertical axles carried by said body portion and supporting said main driving rotors one above the other in horizontal planes located above said body portion, a motor carried by said body portion, and means operatively connecting said motor with said axles for rotating said driving rotors in opposite directions in said horizontal planes; a control device having a small horizontal tail rotor having a constant pitch, a vertical axle carrying said tail rotor, means connected with said tail portion and supporting the last-mentioned vertical axle adjacent to and outside of said tail portion, three vertical control vanes mounted adjacent said vertical axle and located one above the other, means connecting one of said vertical axles with the last-mentioned vertical axle for driving said tail rotor, means carried by said body portion and connected with said control vanes for turning said vanes to a limited angle to control the autohelicopter about its principal roll and yaw axes, a horizontal axle carried by said tail portion and located outside of and adjacent to said tail portion below said main driving rotors and parallel to said principal roll axis, a further vertical control vane carried by said horizontal axle and located in the path of the downwash of the main driving rotors, and means carried by said body portion and connected with the said control vane for turning it to a limited angle to control the autohelicopter about its principal yaw axis at hovering and vertical ascent and descent of the autohelicopter.

2. An autohelicopter, comprising in combination with a cabin having a body portion and a tail portion disposed at the side of said body portion opposite to the direction of flight when air-borne and opposite to the direction of driving when on the ground, two main driving rotors, each of said main driving rotors having a constant pitch, vertical axles carried by said body portion and supporting said main driving rotors one above the other in horizontal planes located above said body portion, a motor carried by said body portion, and means operatively connecting said motor with said axles for rotating said driving rotors in opposite directions in said horizontal planes; a control device having a small horizontal tail rotor having a constant pitch, a vertical axle carrying said tail rotor, means connected with said tail portion and supporting the mentioned vertical axle adjacent to and outside of said tail portion, three vertical control vanes mounted adjacent the said vertical axle and located one above the other, means connecting one of said vertical axles with the last-mentioned vertical axle for driving said tail rotor, means connected with the said means for disconnecting and reversing the rotation of said tail rotor, means carried by said body portion and connected with said control vanes for turning said vanes to a limited angle to control the autohelicopter about its principal roll and yaw axes, a horizontal axle carried by said tail portion and located outside of and adjacent to said tail portion below said main driving rotors and parallel to said principal roll axis, a further vertical control vane carried by said horizontal axle, and located in the path of downwash of the main driving rotors, and means carried by said body portion and connected with the last-mentioned control vane for turning it to a limited angle to control the autohelicopter about its principal yaw axis at hovering and vertical ascent and descent of the autohelicopter.

3. An autohelicopter, comprising in combination with a cabin having a body portion and a tail portion, two main driving rotors, each of said main driving rotors having a constant pitch, vertical axles carried by said body portion and supporting said main driving rotors one above the other in horizontal planes located above said body portion, a motor carried by said body portion, and means operatively connecting said motor with said axles for rotating said driving rotors in opposite directions in said horizontal planes; a control device having a small horizontal tail rotor having a constant pitch, a vertical axle carrying said tail rotor, means connected with said tail portion and supporting the last-mentioned vertical axle adjacent to and outside of said tail portion, a plurality of control vanes mounted adjacent the top and bottom of the said vertical axle and located one above the other, means connecting one of said vertical axles with the said vertical axle for driving said tail rotor, means carried by said body portion and connected with said control vanes for turning said vanes simultaneously in opposite directions to a limited angle to cause tilting of the autohelicopter about its principal roll axis, a horizontal axle carried by said tail portion and located outside of and adjacent to said tail portion below said main driving rotors and parallel to said principal roll axis, a further vertical control vane carried by said horizontal axle, and located in the path of the downwash of the main driving rotors, and means carried by said body portion and connected with the last-mentioned control vane for turning it to a limited angle to control the autohelicopter about its principal yaw axis at hovering and vertical ascent and descent of the autohelicopter.

4. An autohelicopter, comprising in combination with a cabin having a body portion and a tail portion, two main driving rotors, each of said main driving rotors having a constant pitch, vertical axles carried by said body portion and supporting said main driving rotors one above the other in horizontal planes located above said body portion, a motor carried by said body portion, and means operatively connecting said motor with said axles for rotating said driving rotors in opposite directions in said horizontal planes; a control device having a small horizontal tail rotor having a constant pitch, a vertical axle carrying said tail rotor, means connected with said tail portion and supporting the said vertical axle adjacent to and outside of said tail portion, at least one control vane mounted adjacent the said vertical axle, means connecting one of said vertical axles with the last-mentioned vertical axle for driving said tail rotor, a horizontal axle carried by said tail portion and located outside of and adjacent to said tail portion below said main driving rotors and parallel to said principal roll axis, a further vertical control vane carried by said horizontal axle and located in the path of the downwash of the main driving rotors, an actuation pedal carried by said body portion, and means operatively connecting said pedal with said vanes for controlling the first-mentioned vane during a first part of the depression of said pedal and for controlling the last-mentioned vane during a further depression of said pedal.

References Cited in the file of this patent
UNITED STATES PATENTS

| | | |
|---|---|---|
| 1,561,424 | Exel | Nov. 10, 1925 |
| 2,487,020 | Gilcrease | Nov. 1, 1949 |
| 2,595,192 | Garby | Apr. 29, 1952 |
| 2,643,833 | Ambroise | June 30, 1953 |